Oct. 11, 1932.  A. CHURCHWARD  1,882,063
WELDING APPARATUS
Filed April 17, 1930
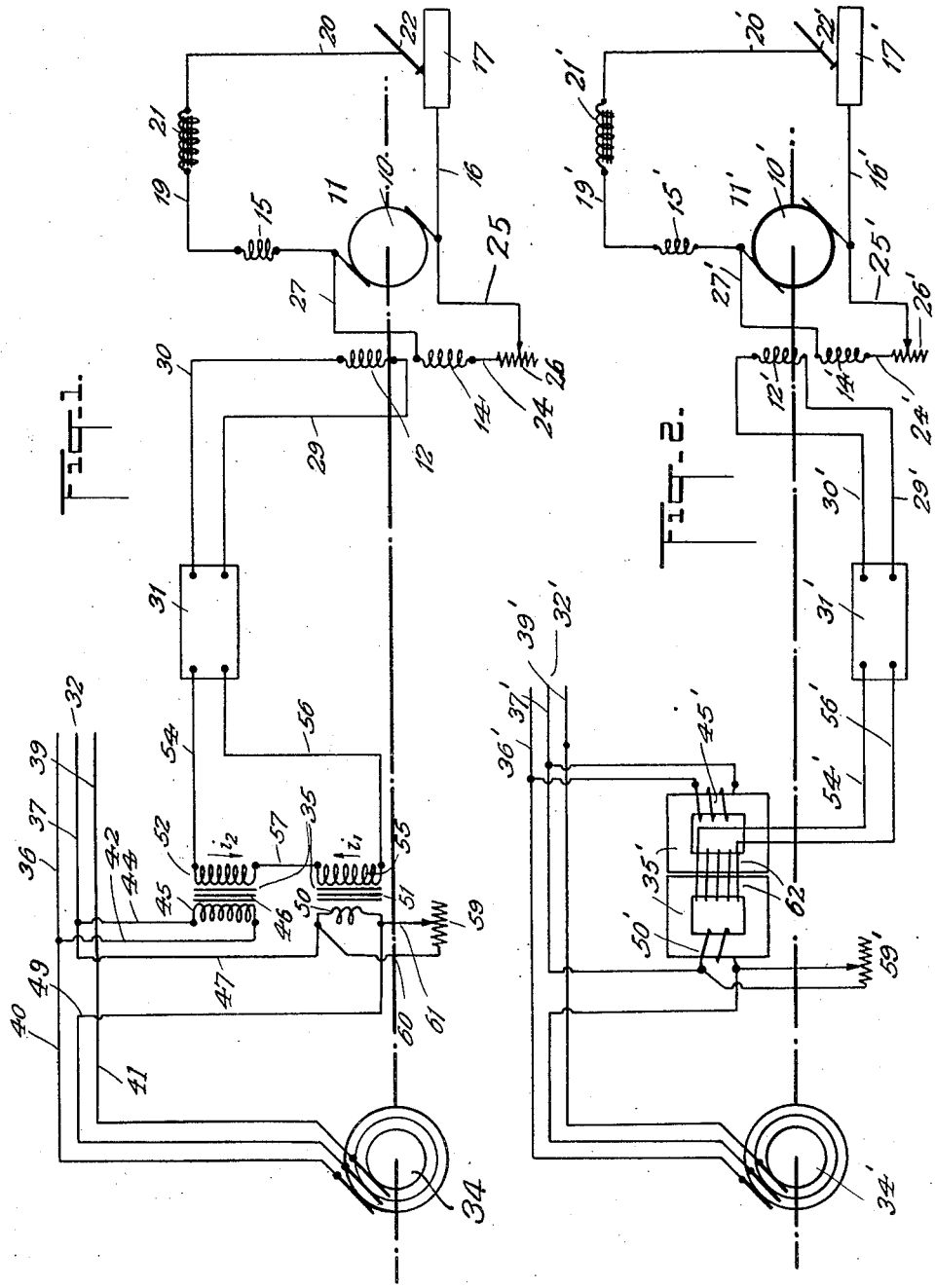
INVENTOR
Alexander Churchward
BY
Williams Rich & Morse
ATTORNEY Patented Oct. 11, 1932

1,882,063

UNITED STATES PATENT OFFICE

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK

WELDING APPARATUS

Application filed April 17, 1930. Serial No. 444,921.

The present invention relates to arc welding apparatus, and more particularly to such apparatus employing a direct current welding generator having a separately excited field winding.

In an apparatus of the character mentioned, a generator as an exciter is generally provided to supply current to the separately excited field winding, and the welding generator is equipped with a bucking series field winding to obtain a drooping characteristic, i. e., a lowering of the generator voltage from open-circuit to welding conditions. When operating such an apparatus, disturbances, such as reversal or breakdown of current in the circuit of the exciter, including the separately excited field winding, and in the welding circuit, including the bucking series field winding, very often take effect, as a result of undue inductive reaction between the separately excited field winding and the bucking series field winding.

An object of the present invention is to provide a welding apparatus employing a direct current welding generator having a separately excited field winding, which apparatus provides an automatic lowering of the generator voltage from open-circuit to welding conditions, and eliminates such disturbances as reversal or breakdown of current in the welding circuit or in the circuit of the separately excited field winding of the generator.

Another object of the invention is to eliminate the use of a bucking series field winding in a welding generator using a separately excited field winding, and yet provide an automatic lowering of the voltage of such generator from open-circuit to welding conditions.

In a welding circuit to which current is supplied from a welding generator having a separately excited field winding and a bucking series field winding, an adjustment in the operating welding current in such a circuit is made possible by the use of a rheostat connected across the bucking series field winding or by a variation in the turns of the bucking series field winding, and the resistance losses inherent in this adjustment as well as the resistance losses inherent in the operation of a bucking series field winding, are of an appreciable magnitude.

A further object of the invention is to provide a welding apparatus employing a welding generator having a separately excited field winding, in which apparatus a lowering of the generator voltage from open-circuit to welding conditions and a variation of the operating welding current are obtained with minimized power consumption involved.

A still further object of the invention is to provide a welding apparatus employing a direct current generator, which apparatus is compact, low in cost of manufacture, and efficient in that it involves minimum operating losses, including the power required for proper excitation of the generator, as well as the power required for proper variation of the welding current.

The invention will be understood with the aid of the following description taken in connection with the accompanying drawing in which Fig. 1 shows diagrammatically a welding apparatus embodying the invention, and Fig. 2 shows a modification of such apparatus.

In the embodiment of the invention shown in the drawing, a direct current welding generator is equipped with a separately excited field winding to which energy is supplied from an alternating current source through a transformer arrangement and a rectifier unit, the latter permitting passage of current in said winding in such a direction as will provide its proper excitation, but checks flow of current in said winding opposite to said direction. The same alternating current source supplies the energy to the motor which drives the welding generator. The transformer arrangement and the driving motor are operatively associated with said source in such a way that, when the welding generator is supplying no current to the welding circuit, the proper current is fed through the rectifier unit to the separately excited field winding of the generator to provide the proper open-circuit voltage of the latter, and, when current is supplied to the work from the welding generator, the corresponding increase of current supplied to the driving motor from the alternating current source produces such reduction of the current fed through the rectifier unit to the separately excited field winding of the welding generator as to obtain a proper lowering of the generated voltage. The welding generator is equipped with an additional field winding which is caused to be excited by the generated voltage, and a rheostat, operatively associated with the transformer arrangement, permits a wide range of operating welding currents and the desired decrease in the generator voltage from open circuit to welding conditions at any operating welding current. The elimination of a bucking series field winding and the provision of a self excited field winding makes possible a rectifier unit and transformer arrangement of very small size and capacity, thereby rendering the welding apparatus compact and low in cost of manufacture. The resistance losses inherent in the operation of a bucking series field winding are eliminated, and disturbances, such as reversal or breakdown of current in either the circuit of the separately-excited field winding or in the welding circuit are totally absent. Also, as will be understood, the apparatus makes possible a large reduction in the resistance losses involved in the variation of the operating welding current supplied by the generator, and a large reduction in the power required for proper excitation of the generator under open-circuit and welding conditions.

Fig. 1 illustrates a welding apparatus employing a direct current welding generator 11 having an armature 10, a separately excited field winding 12, a self-excited field winding 14, and the usual interpole winding 15. One brush of this generator is connected by a conductor 16 to the work 17. The other brush of the generator 11 is connected to the interpole winding 15, and by the conductors 19 and 20 through the usual reactance unit 21 to the welding electrode 22 on the work 17. One side of the self-excited field winding 14 is connected by the conductors 24 and 25, through a rheostat 26, to one brush of the welding generator, the rheostat 26 serving to adjust the current supplied to said winding 14; and the other side of the winding 14 is connected by a conductor 27 to the other brush of the welding generator.

The separately excited field winding 12 is connected by conductors 29 and 30, respectively, with the output terminals of a rectifier unit 31. Energy is transmitted from an alternating current source 32, to which the motor 34 driving the welding generator 11 is connected, through a transformer arrangement 35 operatively associated with said source 32 and motor 34, to the input terminals of the rectifier unit 31.

In the embodiment of the invention shown on the drawing, the source 32 consists of a 3-wire 3-phase line of alternating current, and includes the wires 36, 37 and 39. Two of said wires, 36 and 39, are connected by the conductors 40 and 41, respectively, to two of the terminals of the 3-phase motor 34, and the other wire 37 of said 3-phase line is connected by the conductors 47 and 49 through the primary 50 of the transformer 51, forming part of the aforesaid transformer arrangement 35, to the other terminal of the 3-phase motor 34. The wire 37, to which the primary 50 is connected, and another wire, 36, of the 3-wire 3-phase line 32, are connected by the conductors 44 and 42, respectively, to the primary 45 of another transformer 46, also forming part of the aforesaid transformer arrangement 35. One terminal of the secondary 52 of the transformer 46 is connected by a conductor 54 to an input terminal of the rectifier unit 31, one terminal of the secondary 55 of the transformer 51 is connected by a conductor 56 to the other input terminal of the rectifier unit 31, and the other terminals of the secondaries 52 and 55 are connected together by a conductor 57. A series circuit is thus provided including the secondaries 52 and 55 and the input of the rectifier unit 31.

It is to be noted that the primary 45 of one of the transformers, 46, is connected across two of the wires of the 3-phase line, and that the primary 50 of the other transformer 51 is connected in series with one of such two wires. Such an arrangement of connections of the transformers 46 and 51 to a 3-wire 3-phase line causes the currents in the primaries 45 and 50 to be at all times in phase with one another. Thus, the secondaries 52 and 55 may be so connected that the currents $i_2$ and $i_1$, induced therein by transformer action respectively with the primaries 45 and 50, are at all times 180 electrical degrees out of phase with one another, i. e., opposite in direction to one another, so that the winding 55 will at all times act as a bucking series winding opposing the current set up in the winding 52.

Thus, a resultant current equal to the difference between the opposing induced currents $i_2$ and $i_1$ is transmitted to the rectifier unit 31. The latter may be of such type that it utilizes one-half of the cycles of this resultant current and checks the flow of the other half opposite in direction to said first half; or, it may be of such type as will utilize both halves of the cycles of this resultant current by rectifying one-half of the cycles.

Since the primary 50 is placed in series with the wire 37 of the line 32 supplying current to the motor 34, the effective value of the current in the primary 50 and thus the effective value of the current $i_1$ tends to vary in proportion to the load on the motor 34. When the motor 34 is running light, i. e., when the welding generator is open-circuited or supplying no current to the work 17, the current taken by the motor 34 from the line 32 and flowing through the primary 50 is small, and the effective value of the current $i_1$ is likewise small. Upon striking the arc, however, the current taken by the the motor 34 from the line 32 and flowing through the primary 50 is increased to an appreciable value, so that the effective value of the current $i_1$ is also increased to an appreciable magnitude. On the other hand, the effective value of the current $i_2$ in the secondary 52 induced therein by transformer action with the primary 45 is constant under any load conditions since the current taken by the primary 45 from the wires 36 and 37 is at all times constant and not affected by load conditions. Thus, when the motor 34 is running light, the current $i_2$ provides most of the resultant current to the rectifier unit 31, which may therefore supply the proper unidirectional current to the separately excited field winding 12, so that the latter, in conjunction with the self-excited winding 14, may provide the open-circuit voltage of the generator. Upon striking the arc, however, the resultant current to the rectifier unit 31 is continuously decreased by the current $i_1$ until steady or welding conditions are reached, so that the unidirectional current supplied by the rectifier unit 31 to the separately excited field winding 12 is correspondingly continuously decreased whereby the desired continuous lowering of the voltage of the generator from open-circuit to welding conditions is obtained. The effective final value reached by the current $i_1$ is such as to maintain the proper welding voltage of the welding generator. It is noted that the self-excited field winding 14 also functions to lower the generator voltage from open-circuit to welding conditions.

A selection of the operating welding current in the welding circuit is provided by a rheostat 59 operatively associated with the transformer arrangement 35. In the embodiment of the invention shown in the drawing, this rheostat 59 is connected by conductors 60 and 61 across the primary 50 of the transformer 51. The rheostat 59 does not in itself vary the welding current which is dependent on the character of the work 17. Since the current taken by the motor 34 from the source 32 is dependent on the current in the welding circuit, an adjustment of the rheostat 59 operates to maintain the final value reached by the current in the primary winding 50 substantially constant for any particular type of work to be welded or any particular value of current which the generator is called upon to deliver, so that substantially the same desired decrease in the generator voltage from open circuit to welding conditions is provided for any operating welding current. Thus, the rheostat 59 enables the proper operating welding current to be selected, the primary winding 50 functioning in a manner similar to a bucking series field winding relatively to the primary winding 45 and the rheostat 59 in a manner similar to the usual rheostat in shunt with a bucking series field winding. The same open circuit voltage of the generator is maintained for any operating welding current established by an adjustment of the rheostat 59. It is apparent to those skilled in the art that proper selection of the operating welding current may also be obtained by a variation of the number of turns of the primary 50 of the transformer 51.

A modified transformer arrangement 35' consisting of two transformers having a common secondary winding is shown in Fig. 2. The primary 50' and the primary 45' are connected as before, respectively, in series with the driving motor 34' and wire 37' of a 3-wire 3-phase line of alternating current 32', and across the wires 36' and 37' of said line 32'. A single secondary 62 cooperates with both primaries 50' and 45' and is connected by conductors 54' and 56' to the input terminals of the rectifier unit 31', which supplies a unidirectional current to the separately excited field winding 12' of a welding generator identical in construction to that of Fig. 1. The operation of the arrangement shown in Fig. 2 is evidently similar to that shown in Fig. 1, currents of opposite direction being induced in the secondary 62 by, respectively, the primaries 50' and 45'. These induced currents set up a resultant current which is transmitted by the conductors 54' and 56' to the lectifier unit 31', so that proper lowering of the generator voltage from open-circuit to welding conditions is obtained. The rheostat 59' connected across the primary 50' likewise provides proper selection of the operating welding current supplied by the welding generator.

It is apparent to those skilled in the art that there are various transformer arrangements whereby current may be properly supplied to a rectifier unit for the purposes herein described. It is also evident that these transformer arrangements are not limited to either a 3-phase driving motor or a 3-wire 3-phase alternating current line, but that the principle of the invention may be equally applied to any motor or line, of single phase or any number of phases.

When operating a welding apparatus employing a welding generator equipped with separately excited and bucking series fields and a generator as an exciter for supplying current to the separately excited field winding, such disturbances as reversal or breakdown of current in the welding circuit, as well as in the circuit of the separately excited field winding, very often take effect by reason of undue inductive reaction between the bucking series field winding and the separately excited field winding. The apparatus described herein is evidently totally free of such disturbances. Moreover, when operating the apparatus, there is a quick recovery of the arc from short-circuit conditions, brought about by the elimination of a bucking series field winding and corresponding elimination of transformer action between the latter and the separately excited field winding.

The provision of the self-excited field winding 14, or 14' makes possible a rectifier unit 31 or 31' of smaller size and capacity than would otherwise have to be provided if single separate excitation were used to alone produce the total amount of generated voltage. Moreover, much less power is needed to properly excite the separately excited field winding 12 or 12' than when a bucking series field is used, since no bucking series field has to be overcome. Thus, a rectifier unit 31 or 31' is very small in size and capacity, and the welding apparatus described, including a transformer arrangement, 35 or 35', is compact and comparatively small in cost of manufacture. Assuming an open-circuit voltage of 60 and a maximum welding current of 300 amperes to be the requirements of a welding generator, the capacity of a rectifier unit 31 or 31' may be from 30 to 50 watts. Under similar conditions, the capacity of a generator supplying current to the separately excited field winding of a welding generator equipped with a bucking series field winding would be approximately 400 watts.

In a welding generator equipped with a bucking series field winding, the resistance losses involved in the excitation of said winding are of an appreciable value by reason of the welding current flowing through the same, which current is of a comparatively large magnitude. These resistance losses are not present in the apparatus described, since the latter eliminates the use of a bucking series field winding. The resistance losses in a primary winding, 50 or 50', serving to produce a lowering of the generator voltage from open-circuit to welding conditions, are very small as compared to the resistance losses involved in the operation of a bucking series field winding. This may be readily understood by observing that, when a generator is equipped with a bucking series field winding, the latter forms part of the welding circuit and that the primary winding, 50 or 50', is placed in the circuit of the motor driving the welding generator, the current in the latter circuit being at all times very much lower than the corresponding welding current in the welding circuit. It may be noted that a transformer arrangement 35 or 35' may be so designed that the number of turns of a primary winding 50 or 50' may be caused to be very small, thus reducing the resistance losses involved in its operation to a minimum; it may also be noted that such primary 50 or 50' has little or no effect on the phase relation in the line 32 or 32'.

In a welding apparatus employing a welding generator equipped with a bucking series field winding, a variation of the welding current is often provided by a rheostat shunted across said winding, and the resistance losses inherent in the operation of such a rheostat are evidently large by reason of its connection in the welding circuit through which flows a current of comparatively large magnitude. Thus, the apparatus described also makes possible a large reduction in the resistance losses involved in the variation of the welding current, since the rheostat, 59 and 59', providing a variation of the operating welding current, is connected in the circuit of the driving motor, in which circuit flows a current of comparatively much smaller magnitude.

Under welding conditions, there is effected a large saving in the power required for excitation of the windings 12 and 14, or 12' and 14', as a whole over that which is required to excite the separately excited field winding of a welding generator equipped with a bucking series field winding. This may be readily understood by observing that the windings 12 and 14, or 12' and 14', provide, when welding, part of the generated voltage they provide on open-circuit, and hence require, when welding, much less power for their excitation than the separately excited field winding of a welding generator equipped with a bucking series field winding, in which with a bucking series field winding the separately excited field winding produces a constant field under open-circuit and welding conditions. Moreover, the windings 12 and 14, or 12' and 14', are not required to overcome any bucking field when lowering the generated voltage from open-circuit to welding conditions, and, by reason of this fact alone, when welding, a saving in power for their excitation is effected.

From the above description, it becomes apparent that I have provided a welding apparatus employing a direct current welding generator, which apparatus permits a continuous lowering of the generator voltage from open-circuit to welding conditions and a variation of the welding current supplied by such generator without use of a bucking series field winding. The apparatus described is compact, low in cost of manufacture, and efficient in that it involves minimum operating losses and in that disturbances, such as reversal or breakdown of current in either the welding circuit or the separately excited field winding circuit of such generator are totally absent.

What is claimed is:

1. A welding apparatus comprising a welding generator having a separately excited field winding, a source of current, a motor for driving said generator connected to said source, means for supplying a unidirectional current from said source to said separately excited field winding, and means cooperating with the current supplied to said motor from said source for continuously decreasing said unidirectional current from open circuit to welding conditions.

2. A welding apparatus comprising a welding generator having a separately excited field winding, a source of alternating current, a motor for driving said generator connected to said source, transformer means and rectifier means for supplying a unidirectional current from said source to said separately excited field winding, and other transformer means cooperating with the current supplied to said motor from said source and with said first transformer means for continuously decreasing said unidirectional current from open circuit to welding conditions.

3. A welding apparatus comprising a welding generator having a separately excited field winding and a self excited field winding, a source of current, a motor for driving said generator connected to said source, means for supplying a unidirectional current from said source to said separately excited field winding, and means cooperating with the current supplied to said motor from said source for continuously decreasing said unidirectional current from open circuit to welding conditions.

4. A welding apparatus comprising a welding generator having a separately excited field winding, an alternating current source, a motor for driving said generator connected to said source, a transformer arrangement having two opposing input circuits connected respectively in parallel and in series with said motor, said transformer arrangement also including an output circuit, means for rectifying the resultant current induced in said output circuit, and means for supplying the rectified current to said separately excited field winding.

5. A welding apparatus comprising a welding generator having a separately excited field winding, an alternating current source, a motor for driving said generator connected to said source, a transformer arrangement having two opposing primary circuits connected respectively in parallel and in series with said motor, said transformer arrangement also including an output circuit, means for rectifying the resultant current induced in said output circuit and for supplying the rectified current to said separately excited field winding, and means for maintaining substantially constant the ampere-turns of said series-connected primary circuit at any operating welding current.

6. A welding apparatus comprising a welding generator having a separately excited field winding and a self-excited field winding, an alternating current source, a motor for driving said generator connected to said source, a transformer arrangement having two opposing input circuits connected respectively in parallel and in series with said motor, said transformer arrangement also including an output circuit, means for rectifying the resultant current induced in said output circuit, means for supplying the rectified current to said separately excited field winding, and a rheostat connected in parallel with said series-connected input circuit.

In testimony whereof, I have affixed my signature to this specification.

ALEXANDER CHURCHWARD.